United States Patent [19]

Ishihara et al.

[11] Patent Number: 5,607,621
[45] Date of Patent: Mar. 4, 1997

[54] PHOSPHORESCENT SYNTHETIC RESIN MATERIAL METHOD FOR PRODUCTION THEREOF, AND FORMED ARTICLE

[75] Inventors: Kiyomitsu Ishihara, Uozu; Takayuki Yonetani, Amagasaki; Yoshiharu Yamaguchi, Namerikawa; Toru Koma, Sanda, all of Japan

[73] Assignee: YKK Corporation, Tokyo, Japan

[21] Appl. No.: 577,523

[22] Filed: Dec. 22, 1995

[30] Foreign Application Priority Data

Dec. 28, 1994 [JP] Japan .................. 6-337584

[51] Int. Cl.$^6$ .................................. C09K 11/02
[52] U.S. Cl. ................ 252/301.36; 252/301.4 R; 264/21; 264/143; 264/331.11
[58] Field of Search .............. 252/301.36, 301.4 R; 264/21, 143, 331.11

[56] References Cited

U.S. PATENT DOCUMENTS

| | | | |
|---|---|---|---|
| 4,640,787 | 2/1987 | Goguen | 252/301.36 |
| 5,424,006 | 6/1995 | Murayama et al. | 252/301.4 R |

FOREIGN PATENT DOCUMENTS

| | | |
|---|---|---|
| 179911 | 11/1986 | Japan . |
| 7-300722 | 11/1995 | Japan . |
| 7-313036 | 12/1995 | Japan . |

*Primary Examiner*—Prince Willis, Jr.
*Assistant Examiner*—Alan D. Diamond
*Attorney, Agent, or Firm*—Hill, Steadman & Simpson

[57] ABSTRACT

Disclosed are a phosphorescent synthetic resin material capable of absorbing and accumulating light therein in the light and phosphorescing in the dark, a method for the production of the material, and a formed article or molded article made of the phosphorescent synthetic resin material. The phosphorescent synthetic resin material having a phosphorescent pigment, $SrAl_2O_4$, uniformly dispersed in the synthetic resin is obtained by mixing the synthetic resin with the phosphorescent pigment and an activator and kneading the resultant mixture at a temperature 10 to 20° C. higher than the melting point of the synthetic resin. In a preferred embodiment, the resultant compound is extruded at a temperature 10° to 20° C. higher than the melting point of the synthetic resin under an extrusion pressure in the range of 50 to 130 kg/cm$^2$ and the extruded strands are chopped to produce pellets. By injection molding or extrusion molding the produced pellets into a desired shape, the formed article of synthetic resin possessing outstanding phosphorescent properties is obtained.

9 Claims, 3 Drawing Sheets

PHOSPHORESCENT SYNTHETIC RESIN MATERIAL METHOD FOR PRODUCTION THEREOF, AND FORMED ARTICLE

BACKGROUND OF THE INVENTION

1. Field of the Invention

This invention relates to a phosphorescent synthetic resin material capable of absorbing and accumulating light therein in the light and phosphorescing in the dark, a method for the production of the material, and a formed article or molded article made of the phosphorescent synthetic resin material.

2. Description of the Prior Art

Heretofore, ZnS:Cu, (Ca, Sr)S:Bi, etc. have been known as phosphorescent pigments (long afterglow phosphors). Generally, zinc sulfide has been widely used.

These phosphorescent pigments have the nature of exciting themselves by absorbing the light such as the daylight or the fluorescent light (accumulation of light) and, when placed in a dark place, emitting light. Since these phosphorescent pigments are capable of repeating the cycle of absorbing-accumulating-emitting light over and over again, they find extensive utility in various applications such as marks and signs for prevention of disasters and preservation of safety used in such a place as an emergency exit which should be perceived visually even in the dark, various guide signs used in automobiles and buildings, dials in watches, and such accessories as tie pins and pendants.

For general-purpose applications, these phosphorescent pigments are generally used in the form of phosphorescent sheets or paints by reason of the convenience of handling.

As an example of the incorporation of a phosphorescent pigment in resin, published Japanese Utility Model Application, KOKAI (Early Publication) No. (hereinafter referred to briefly as "JUM-A-") 61-179,911 proposes the formation of engaging elements of a slide fastener with a synthetic resin containing zinc sulfide as a phosphorescent pigment at a concentration in the range of 25 to 30% by weight.

Generally, when a phosphorescent pigment is incorporated in a synthetic resin, however, this incorporation entails the disadvantage that the phosphorescent pigment is not easily dispersed uniformly in the synthetic resin and the resultant phosphorescent synthetic resin inevitably emits light of uneven color.

Since zinc sulfide which has been heretofore used generally as a phosphorescent pigment phosphoresces with unduly low luminance, it is necessary that the zinc sulfide be combined with a radioactive substance and consequently enabled by the radiation of the added substance to be sufficiently excited or, as stated in JUM-A-61-179,922 mentioned above, the phosphorescent pigment be incorporated in the synthetic resin in a large amount.

The radioactive substance, however, has the problem that it must be handled under a rigid standard of safety control and, moreover, the disposal of the waste arising therefrom incurs great expense. Further, when the phosphorescent pigment is incorporated in a large amount in the synthetic resin, the problem ensues that the resultant phosphorescent resin will not easily acquire sufficient strength necessary for a resinous product.

SUMMARY OF THE INVENTION

An object of the present invention is to provide a phosphorescent synthetic resin material which phosphoresces with high luminance for a long time in the night or in a dark place, displays outstanding phosphorescent properties including perfect freedom from uneven color of the light of phosphorescence, precludes degradation of resinous quality, and possesses ample strength enough for enabling a formed article made of this material to withstand repeated use.

Another object of the present invention is to provide a formed article or molded article made of such a phosphorescent synthetic resin material as mentioned above.

A further object of the present invention is to provide a method for efficient production of a phosphorescent synthetic resin material possessing such outstanding phosphorescent properties as mentioned above.

To accomplish the objects mentioned above, the present invention provides a phosphorescent synthetic resin material obtained by having a phosphorescent pigment, $SrAl_2O_4$, dispersed in a synthetic resin at a concentration in the range of 5 to 20% by weight.

Preferably, this phosphorescent synthetic resin material, for the sake of ensuring uniform dispersion of the phosphorescent pigment in the synthetic resin, incorporates therein during the course of production an activator or a dispersant, preferably a surfactant containing liquid paraffin at a concentration of not less than 70% by weight. By the same token, it is desirable that the phosphorescent pigment, $SrAl_2O_4$, should possess an average particle diameter in the range of 1 to 75 μm, preferably 5 to 75 μm, most preferably 5 to 25 μm.

The present invention further provides a method for the production of a phosphorescent synthetic resin material, which comprises the steps of mixing the synthetic resin with the phosphorescent pigment, $SrAl_2O_4$, and an activator and kneading the resultant mixture at a temperature 10° to 20° C. higher than the melting point of the synthetic resin.

In a preferred embodiment, the resultant mix or compound is extruded at a temperature 10° to 20° C. higher than the melting point of the synthetic resin under an extrusion pressure in the range of 50 to 130 kg/cm$^2$ and the extruded strands of the compound are chopped to produce pellets. By injection molding or extrusion molding the produced pellets into a desired shape, a formed article of synthetic resin possessing outstanding phosphorescent properties is obtained. Otherwise, the phosphorescent synthetic resin material produced by the kneading may be directly subjected as to press molding.

BRIEF DESCRIPTION OF THE DRAWINGS

Other objects, features, and advantages of the invention will become apparent from the following description taken together with the drawings, in which.

DETAILED DESCRIPTION OF THE INVENTION

One of the salient features of the phosphorescent synthetic resin material of the present invention resides in the fact that it contains $SrAl_2O_4$ as a phosphorescent pigment.

The phosphorescent pigment, $SrAl_2O_4$, possesses excellent basic properties as a phosphorescent pigment. For instance, it enjoys outstanding qualities as exhibiting an emission spectrum (peak wavelength; 520 nm) which approximates the spectrum of human visibility and exhibiting a broad excitation spectrum (peak wavelength; about 365 nm) with high excitation efficiency to the ultraviolet light in the short wavelength region. Further, the phosphorescent pigment, $SrAl_2O_4$, possesses such excellent qualities as producing extremely high luminance and possessing a long afterglow time, that is to say, continuing the emission of light for a long time when it emits light in a dark place after absorption and accumulation of light (excitation). It manifests an extremely high afterglow luminance about five to ten times or more as high as the conventionally widely used zinc sulfide. In contrast to the conventional zinc fluoride phosphorescent pigment which is decomposed as by the ultraviolet light and consequently caused to suffer gradual degradation of properties, $SrAl_2O_4$ is very stable enough to withstand protracted use even under such outdoor conditions as direct exposure to the sunlight.

In the incorporation of $SrAl_2O_4$ possessing such outstanding phosphorescent properties as mentioned above into the synthetic resin, it is necessary that due consideration be given to enabling the pigment to manifest the properties fully and, at the same time, avoid impairing the physical properties of the resin itself.

In the phosphorescent synthetic resin material of the present invention, the content of the phosphorescent pigment, $SrAl_2O_4$, is defined in the range of 5 to 20% by weight. If the content of $SrAl_2O_4$ is less than 5% by weight, the phosphorescence of the produced resin material will have no sufficient luminance because the amount of the phosphorescent pigment is unduly small and will not be easily perceived visually in the dark. Conversely, if the content exceeds 20% by weight, though the phosphorescence indeed has necessary luminance, the unduly large amount of the phosphorescent pigment will impair the dispersibility of this pigment in the synthetic resin, render difficult the kneading and the extrusion of the mixed components and consequently bring about elevation of the processing heat and inevitable thermal decomposition of the synthetic resin, and tend to discolor to a black color and embrittle the produced phosphorescent synthetic resin material.

It has been found by the inventors' study that the particle size of the phosphorescent pigment, $SrAl_2O_4$, has an effect to bear on the phosphorescent luminance and the moldability of the phosphorescent synthetic resin material. If the pigment $SrAl_2O_4$ has an unduly small particle diameter, the luminance of phosphorescence will tend to decline. For the sake of securing sufficient luminance of phosphorescence, therefore, it is desirable that the average particle diameter of $SrAl_2O_4$ be not less than 1 μm, preferably not less than 5 μm.

Meanwhile from the standpoint of moldability, it is desirable that the average particle diameter of $SrAl_2O_4$ should be not more than 75 μm. The average particle diameter is appropriately in the range of 15 to 25 μm when the phosphorescent synthetic resin material is intended for injection molding or in the range of 10 to 20 μm when the material is intended for extrusion molding. When this material is intended for monofilament extrusion molding, the average particle diameter is desired to be in the range of 1 to 10 μm, preferably 5 to 8 μm.

Generally, $SrAl_2O_4$ is obtained by adding such an activator as europium (Eu) to $SrCO_3$, $Al_2O_3$, and a flux compounded in a prescribed ratio, mixing the components, calcining the resultant mix at an elevated temperature exceeding about 1200° C. in a reducing atmosphere for several hours, and finely pulverizing the calcined mix. Since the product of this procedure has varying ranges of particle size distribution, a fine $SrAl_2O_4$ powder adjusted to an average particle diameter suitable for the type of molding aimed at can be selected by classifying the fine powder obtained at the end of the procedure.

Further in the present invention, the phosphorescent pigment, $SrAl_2O_4$, is added in conjunction with an activator or a dispersant to the synthetic resin during the course of production of the phosphorescent synthetic resin material. The use of this additive enhances the affinity of the phosphorescent pigment for the synthetic resin, improves the dispersibility of the phosphorescent pigment and, at the same time, imparts suitable flexibility to the synthetic resin, and exalts the balance of strength of the produced phosphorescent synthetic resin material.

In this case, it is desired to add the activator in the least allowable amount which is sufficient for attaining uniform dispersion of the phosphorescent pigment in the synthetic resin. Thus, the amount of this addition is set in the range of 0.05 to 0.5% by weight. If the amount of the activator thus added is less than 0.05% by weight, the phosphorescent pigment will acquire no sufficient affinity for the synthetic resin, tend to undergo agglomeration and attain no easy dispersion in the synthetic resin, and cause disruption of the evenness of the color of phosphorescence. Conversely, if this amount exceeds 0.5% by weight, the synthetic resin will undergo thermal decomposition during the course of the kneading at an elevated temperature which will be specifically described afterward and cause the product of the kneading to be easily discolored to a blackish tint because the synthetic resin, when abounding in impurities, tends to be thermally decomposed and the activator in itself is a foreign matter for the synthetic resin. Further, if the activator is added in an unduly large amount, the problem will issue that the synthetic resin tends to soften and suffers degradation of strength.

As the activator mentioned above, a surfactant formed mainly of liquid paraffin, specifically a surfactant containing liquid paraffin at a concentration of not less than 70% by weight, is used advantageously. As concrete examples of the surfactant which answers the description, a combination consisting of 80% of liquid paraffin, 10% of a nonionic surfactant, and 10% of fatty acid (produced by Dai-Nippon Ink & Chemicals, Inc. and marketed under trademark designation of "Dispersol SP-0472") and a combination consisting of liquid paraffin as a main component and a nonionic macromolecular activator (produced by Kao Soap Co., Ltd. and marketed under product code of "PL-210") may be cited. It is allowable to use liquid paraffin alone.

It has been found by the inventors' study that for the purpose of effecting uniform dispersion of the phosphorescent pigment, $SrAl_2O_4$, in the synthetic resin without causing the resin itself to succumb to such adverse phenomena as deterioration of strength and discoloration, the temperature used during the course of the kneading constitutes an important factor.

Generally, the synthetic resin material and the additive incorporated therein are thermally kneaded in an extruder and extruded by the extruder. The strands consequently obtained are chopped in a suitable length to produce pellets. In the production of the phosphorescent synthetic resin material of the present invention, the temperature to be used during the course of the kneading and the extrusion is set at a level 10° to 20° C. higher than the melting point of the synthetic resin. If the temperature during the course of the kneading and the extrusion is less than 10° C. higher than the melting point of the synthetic resin, the synthetic resin will not be softened enough to be easily kneaded and extruded. Conversely, if this temperature is more than 20° C. higher than the melting point, the unduly high temperature will easily induce the resin and the activator to undergo thermal decomposition, cause discoloration, and result in degradation of strength.

It is desirable that the pressure to be used for the extrusion should be in the range of 50 to 130 kg/cm². If the pressure of extrusion is less than 50 kg/cm², the extrusion speed will be lowered, the productivity of the operation of extrusion will be degraded, and the fact that the time of exposure to heat is elongated will cause the resin and the activator to undergo thermal decomposition. Conversely, if this pressure exceeds 130 kg/cm², the resin while being kneaded with a screw and extruded through a die will copiously generate the processing heat and reach a temperature exceeding the temperature defined above, induce the resin and the activator to undergo thermal decomposition, and tend to cause discoloration and deterioration of strength.

The phosphorescent synthetic resin material according to the present invention produced as described above particularly in the form of pellets can be manufactured into a formed article or molded article of a desired shape by a varying molding method such as, for example, injection molding, extrusion molding, transfer molding, and compression molding. It can be used for the production of such articles of commerce having improved perceptibility in the night or in the dark and such articles of commerce having improved fashionability as fastening parts including sliders, crampers, pull tabs, top and bottom stops, elements (engaging teeth), and fastener tapes in slide fasteners, personal ornaments including buttons, buckles, belts, pendants, and accessories (tiepins, hatpins, bracelets, earrings, watch chains, etc.), and dials in watches.

As the synthetic resin which forms the basis, a varying resinous material may be selected to suit the purpose for which the end product is to be used. As concrete examples of the resinous material, acrylic resin, ABS (acrylonitrile-butadiene-styrene) resin, acetal resin (homopolymer or copolymer), polyethylene terephthalate (PET), polyamides such as nylon 6 and nylon 66, vinyl chloride resin, polycarbonates, polyphenylene oxide, polybutylene terephthalate, polyimide, polyethylene, polypropylene, and polystyrene may be cited. The temperature during the course of the kneading and the extrusion varies with the kind of resin to be used. Properly, it is about 220° C. for acrylic resin, about 250° C. for ABS resin, about 192° to 205° C. for acetal resin (POM), about 290° C. for PET, about 270° C. for nylon 6, about 290° C. for nylon 66, and about 180° C. for vinyl chloride resin. The conditions for the production of a formed article of the phosphorescent synthetic resin can be properly set to suit the kind of resin to be used. In the case of injection molding, for example, it is generally appropriate to set the pressure of injection at a level in the range of 600 to 1500 kg/cm², preferably 800 to 1200 kg/cm².

Since the phosphorescent synthetic resin material of the present invention and the formed article thereof use $SrAl_2O_4$ as the phosphorescent pigment and have this pigment uniformly dispersed in the synthetic resin as described above, they phosphoresce with high luminance for a long time in the night or in the dark, display outstanding phosphorescent properties including perfect freedom from uneven color of the light of phosphorescence, preclude degradation of resinous quality, and possess ample strength enough for enabling the formed article to withstand repeated use. Further, since $SrAl_2O_4$ is used as the phosphorescent pigment, the produced phosphorescent article is deteriorated only sparingly by the ultraviolet light and, therefore, can be used outdoors with improved durability. Since this phosphorescent article contains no radioactive substance, it avoids exerting any adverse effect on human body and has no restriction on the largeness of the phosphorescent surface.

According to the method of the present invention, the phosphorescent pigment, $SrAl_2O_4$, can be uniformly dispersed in the synthetic resin and the phosphorescent synthetic resin material possessing such outstanding phosphorescent properties as mentioned above can be efficiently produced by adding the phosphorescent pigment in conjunction with the activator of a prescribed amount to the synthetic resin and controlling such factors as temperature during the course of kneading the mixture.

Figure 1:
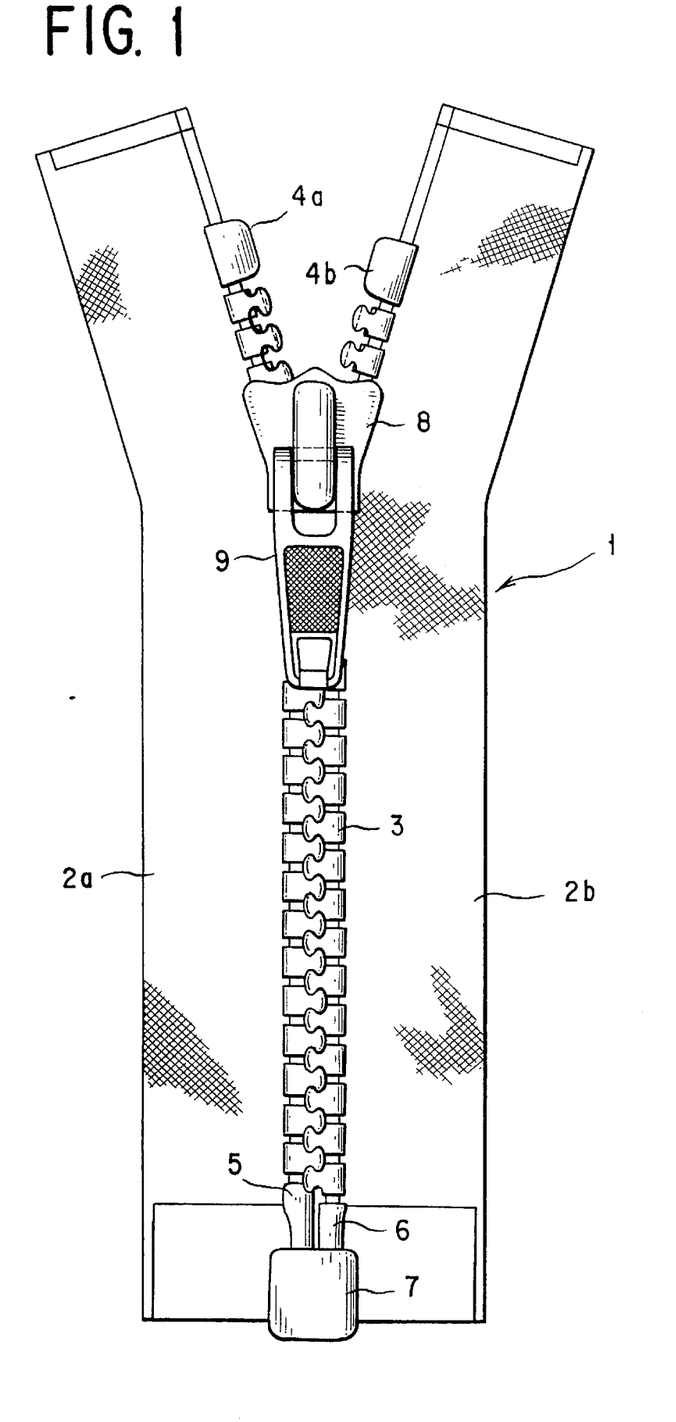
FIG. 1 is a plan view showing one example of the slide fastener which is formed of a phosphorescent synthetic resin material according to the present invention.

Referring to the drawings, FIG. 1 is a plan view of a slide fastener which is formed of the phosphorescent synthetic resin material of the present invention. This phosphorescent slide fastener 1 has elements 3 of synthetic resin attached as regularly spaced to the opposed edges of a pair of left and right fastener tapes 2a and 2b, top stops 4a and 4b attached to the upper end parts of the tapes, and a butterfly bar 5 attached to the fastener tape 2a and a box bar 6 and a box 7 for sheathing the box bar 6 attached to the other fastener tape 2b all in the lower end part. By moving a slider 8 on the elements 3, the chains of elements can be brought into engagement and disengagement. In this slide fastener 1, all the parts, i.e. the slider 8, a pull tab 9, the tapes 2a and 2b, the elements 3, the top stops 4a and 4b, the butterfly bar 5, the box bar 6, and the box 7 are formed of the phosphorescent synthetic resin material of the present invention as by the injection molding. When the slide fasteners of this construction are adopted for use in such articles as anoraks and outdoor tents, therefore, they enable the articles to acquire enhanced fashionability and exalted perceptibility in the night or in the dark.

Figure 2:
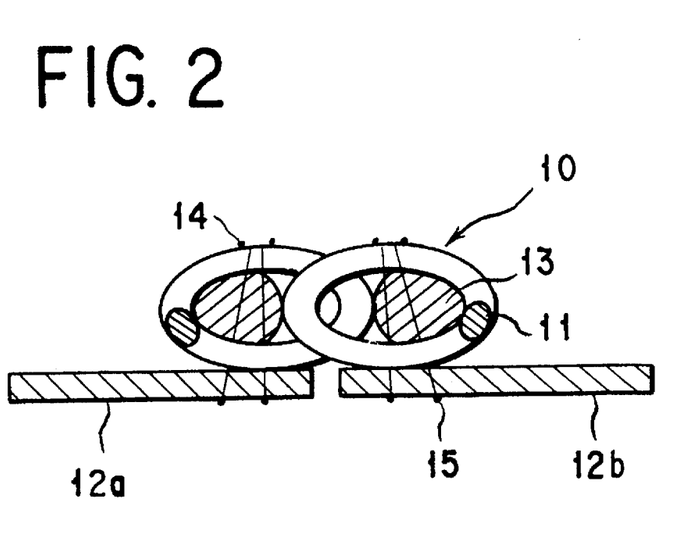
FIG. 2 is a fragmentary cross sectional view of a coil fastener provided with coiled elements which are formed of the phosphorescent synthetic resin material of the present invention.

FIG. 2 shows the construction of a coil fastener 10 using in coiled elements 11 thereof such monofilaments as are formed of the phosphorescent synthetic resin material of the present invention. To ensure perfect manifestation of the phosphorescent properties of the coiled elements 11 sewn to the opposed edges of a pair of left and right fastener tapes 12a and 12b, it is advantageous to use transparent monofilaments or multifilaments (such as, for example, nylon yarns) for sewing yarns (a lower yarn 14 and an upper yarn 15). The reference numeral 13 stands for a core cord.

Now, the working examples embodying the present invention will be described below.

Example 1:

An activator (produced by Dai-Nippon Ink & Chemicals, Inc. and marketed under trademark designation of "Dispersol SP-0472") was added in a varying amount indicated in Table 1 to an acrylic resin. They were mixed for a period in the approximate range of 1 to 2 minutes per 5 kg of master batch. The phosphorescent pigment, $SrAl_2O_4$, was subsequently incorporated in the resultant mixture at a varying ratio indicated in Table 1 and they were mixed for a period in the approximate range of 1.5 to 2 minutes per 5 kg of master batch. The produced compound was introduced into the hopper of an extruder and kneaded and extruded under the conditions of a kneading and extruding temperature of about 220° C. and an extrusion pressure in the range of 50 to 80 kg/cm². The extruded strands were chopped to produce phosphorescent pellets. The pellets were injection molded under the conditions of an injection temperature of about 205° C. and a screw revolution speed of about 120 r.p.m. to produce elements for a slide fastener. The composition of the phosphorescent synthetic resin material used herein and the characteristic properties thereof are collectively shown in Table 1.

Example 2:

An activator (Dispersol SP-0472) was added in a varying amount indicated in Table 2 to spherical polyacetal (copolymer or homopolymer) pellets. They were mixed for a period in the approximate range of 1 to 2 minutes per 5 kg of master batch. The phosphorescent pigment, $SrAl_wO_4$, was subsequently incorporated in the resultant mixture at a varying ratio indicated in Table 2 and they were mixed for a period in the approximate range of 1.5 to 2 minutes per 5 kg of master batch. The produced compound was introduced into the hopper of an extruder and kneaded and extruded under the conditions of a kneading and extruding temperature in the approximate range of 192° to 205° C. and an extrusion pressure in the range of 50 to 100 kg/cm². The extruded strands were chopped to produce phosphorescent pellets. The pellets were injection molded under the conditions of an injection temperature of about 205° C. and a screw revolution speed in the approximate range of 80 to 150 r.p.m. to produce elements for a slide fastener. The composition of the phosphorescent synthetic resin material used herein and the characteristic properties thereof are collectively shown in Table 2.

Figure 3:
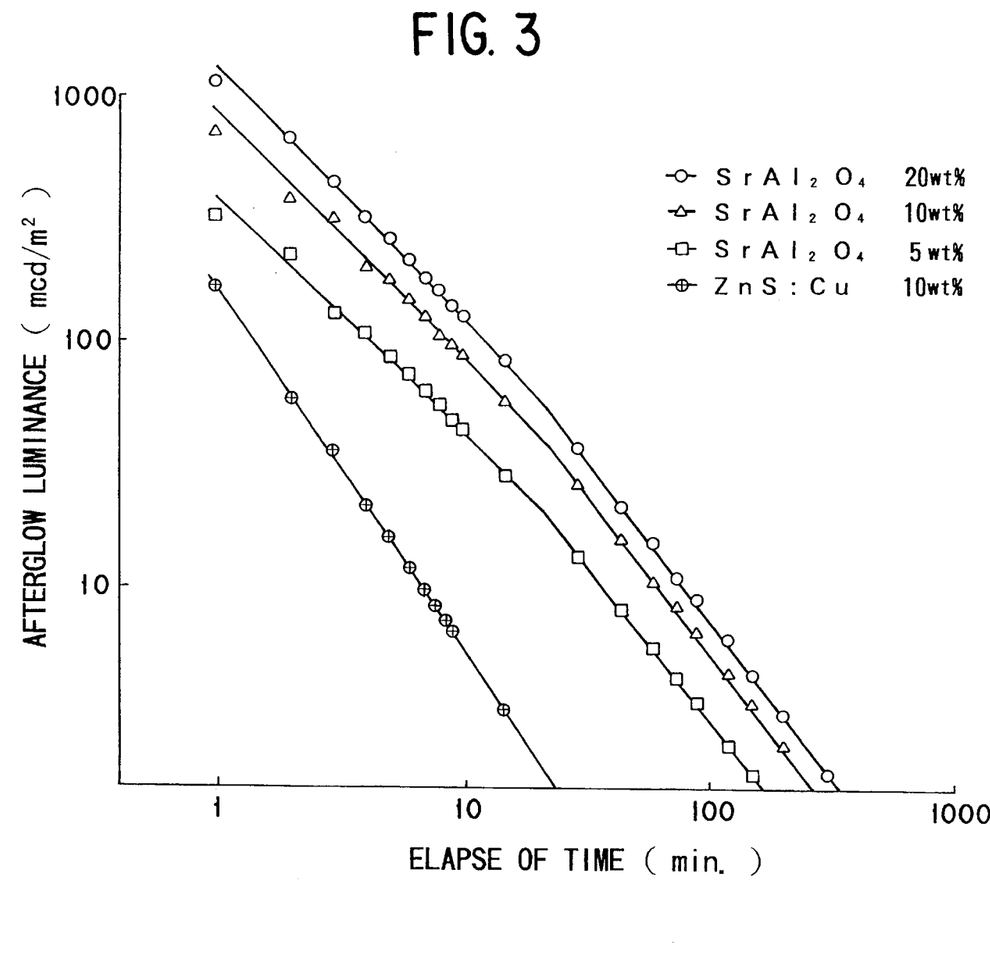
FIG. 3 is a graph showing the afterglow luminance characteristics of a formed article of a polyacetal-based phosphorescent resin.

The afterglow luminance properties of the formed products are shown in FIG. 3. For comparison, the afterglow luminance property of a formed article obtained by using the conventional zinc sulfide phosphorescent pigment is additionally shown in FIG. 3. The afterglow luminance was determined by using a standard $D_{65}$ illuminant for irradiation and exciting a sample under the conditions of 400 lux and 20 minutes. It is clearly noted from the results shown in FIG. 3 that the molded article of the present invention using $SrAl_2O_4$ as a phosphorescent pigment obtained very high afterglow luminance and a fairly long afterglow time as compared with the molded article using a zinc sulfide phosphorescent pigment.

TABLE 1

Composition and characteristic properties of phosphorescent resin material based on acrylic resin

| Pigment (wt%) | Activator (wt%) | Dispersibility of pigment | Phosphorescent property | Abrasion resistance | Strength | Moldability by injection |
|---|---|---|---|---|---|---|
| 5 | 0.01 | Uneven | Insufficient, uneven | Good | Good | Acceptable |
| | 0.05 | Even | " | " | " | " |
| | 0.10 | " | " | " | " | " |
| | 0.30 | " | Good | " | " | " |
| | 0.50 | " | " | " | " | " |
| | 1.00 | " | " | " | " | Discoloration found |
| 10 | 0.01 | Uneven | Sufficient, uneven | Good | Good | Acceptable |
| | 0.05 | Even | " | " | " | " |
| | 0.10 | " | " | " | " | " |
| | 0.30 | " | Good | " | " | " |
| | 0.50 | " | " | " | " | " |
| | 1.00 | " | " | " | " | Discoloration found |
| 15 | 0.01 | Uneven | Sufficient, uneven | Good | Good | Acceptable |
| | 0.05 | Even | " | " | " | " |
| | 0.10 | " | " | " | " | " |
| | 0.30 | " | Good | " | " | " |
| | 0.50 | " | " | " | " | " |
| | 1.00 | " | " | " | " | Discoloration found |
| 20 | 0.01 | Uneven | Good, uneven | Good | Good | Burning and insufficient filling tended to occur during the course of molding. |
| | 0.05 | Even | " | " | " | |
| | 0.10 | " | " | " | " | |
| | 0.30 | " | Good | " | " | |
| | 0.50 | " | " | " | " | |
| | 1.00 | " | " | " | " | |
| 25 | 0.01 | Uneven | Good, uneven | Good | Deficient | Burning and insufficient filling tended to occur during the course of molding. |
| | 0.05 | Even | " | " | " | |
| | 0.10 | " | " | " | " | |
| | 0.30 | " | Good | " | " | |
| | 0.50 | " | " | " | " | |
| | 1.00 | " | " | " | " | |

TABLE 2

Composition and characteristic properties of phosphorescent resin material based on polyacetal (copolymer or homopolymer)

| Pigment (wt%) | Activator (wt%) | Dispersibility of pigment | Phosphorescent property | Abrasion resistance | Strength | Moldability by injection |
|---|---|---|---|---|---|---|
| 5 | 0.01 | Uneven | Insufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Insufficient | " | " | " |
|   | 1.00 | " | " | " | " | Discoloration liable to appear |
| 10 | 0.01 | Uneven | Sufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Good | " | " | " |
|   | 1.00 | " | " | " | " | Discoloration liable to appear |
| 15 | 0.01 | Uneven | Sufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Good | " | " | " |
|   | 1.00 | " | " | " | " | Discoloration liable to appear |
| 20 | 0.01 | Uneven | Good, uneven | Good | Good | Burning and insufficient filling occasionally observed. |
|   | 0.05 | " | " | " | " |  |
|   | 0.10 | " | " | " | " |  |
|   | 0.30 | " | " | " | " |  |
|   | 0.50 | Even | Good | " | " |  |
|   | 1.00 | " | " | " | " |  |
| 25 | 0.01 | Uneven | Good, uneven | Good | Deficient | Breakage of yarns occurred during the course of extrusion. Insufficient filling occasionally occurred during the course of molding. |
|   | 0.05 | " | " | " | " |  |
|   | 0.10 | " | " | " | " |  |
|   | 0.30 | " | " | " | " |  |
|   | 0.50 | Even | Good | " | " |  |
|   | 1.00 | " | " | " | " |  |

Example 3:

An activator (Dispersol SP-0472) was added in a varying amount indicated in Table 3 to spherical pellets of nylon 6 or nylon 66. They were mixed for a period in the approximate range of 1 to 2 minutes per 5 kg of master batch. The phosphorescent pigment, $SrAl_2O_4$, was subsequently incorporated in the resultant mixture at a varying ratio indicated in Table 3 and they were mixed for a period in the approximate range of 1.5 to 2 minutes per 5 kg of master batch. The produced compound was introduced into the hopper of an extruder and kneaded and extruded under the conditions of a kneading and extruding temperature in the approximate range of 270° to 290° C. and an extrusion pressure in the range of 50 to 80 kg/cm². The extruded strands were chopped to produce phosphorescent pellets. The pellets were injection molded under the conditions of an injection temperature of about 205° C. and a screw revolution speed in the approximate range of 80 to 150 r.p.m. to produce elements for a slide fastener. The composition of the phosphorescent synthetic resin material and the characteristic properties thereof are collectively shown in Table 3.

Example 4:

An activator (Dispersol SP-0472) was added in a varying amount indicated in Table 4 to cylindrical pellets of PET. They were mixed for a period in the approximate range of 1 to 2 minutes per 5 kg of master batch. The phosphorescent pigment, $SrAl_2O_4$, was subsequently incorporated in the resultant mixture at a varying ratio indicated in Table 4 and they were mixed for a period in the approximate range of 1.5 to 2 minutes per 5 kg of master batch. The produced compound was introduced into the hopper of an extruder and kneaded and extruded under the conditions of a kneading and extruding temperature of about 290° C. and an extrusion pressure in the range of 50 to 80 kg/cm². The extruded strands were chopped to produce phosphorescent pellets. The elements for a slide fastener were molded by extruding the resultant pellets. The composition of the phosphorescent synthetic resin material and the characteristic properties thereof are collectively shown in Table 4.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

TABLE 3

Composition and characteristic properties of phosphorescent resin material based on nylon 6 or nylon 66

| Pigment (wt%) | Activator (wt%) | Dispersibility of pigment | Phosphorescent property | Abrasion resistance | Strength | Moldability by injection |
|---|---|---|---|---|---|---|
| 5 | 0.01 | Uneven | Insufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Insufficient | " | " | " |
|   | 1.00 | " | " | " | " | Discoloration found |
| 10 | 0.01 | Uneven | Sufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Good | " | " | " |
|   | 1.00 | " | " | " | " | Discoloration found |
| 15 | 0.01 | Uneven | Sufficient, uneven | Good | Good | Acceptable |
|   | 0.05 | " | " | " | " | " |
|   | 0.10 | " | " | " | " | " |
|   | 0.30 | " | " | " | " | " |
|   | 0.50 | Even | Good | " | " | " |
|   | 1.00 | " | " | " | " | Discoloration found |
| 20 | 0.01 | Uneven | Good, uneven | Good | Good | Burning and insufficient filling tended to occur during the course of molding. |
|   | 0.05 | " | " | " | " | |
|   | 0.10 | " | " | " | " | |
|   | 0.30 | " | " | " | " | |
|   | 0.50 | Even | Good | " | " | |
|   | 1.00 | " | " | " | " | |
| 25 | 0.01 | Uneven | Good, uneven | Good | Deficient | Burning and insufficient filling tended to occur during the course of molding. |
|   | 0.05 | " | " | " | " | |
|   | 0.10 | " | " | " | " | |
|   | 0.30 | " | " | " | " | |
|   | 0.50 | " | Good | " | " | |
|   | 1.00 | Even | " | " | " | |

TABLE 4

Composition and characteristic properties of phosphorescent resin material based on nylon 6 or nylon 66

| Pigment (wt%) | Activator (wt%) | Dispersibility of pigment | Phosphorescent property | Abrasion resistance | Strength | Moldability by injection |
|---|---|---|---|---|---|---|
| 5 | 0.01 | Uneven | Insufficient, uneven | Good | Good | Acceptable |
|   | 0.05 | " | " | " | " | " |
|   | 0.10 | Even | " | " | " | " |
|   | 0.30 | " | Insufficient | " | " | " |
|   | 0.50 | " | " | " | " | " |
|   | 1.00 | " | " | " | " | " |
| 10 | 0.01 | Uneven | Sufficient, uneven | Good | Good | Effect of particle size prominent |
|   | 0.05 | " | " | " | " | |
|   | 0.10 | Even | " | " | " | |
|   | 0.30 | " | Good | " | " | |
|   | 0.50 | " | " | " | " | |
|   | 1.00 | " | " | " | " | |
| 15 | 0.01 | Uneven | Sufficient, uneven | Good | Good | Effect of particle size prominent |
|   | 0.05 | " | " | " | " | |
|   | 0.10 | Even | " | " | " | |
|   | 0.30 | " | Good | " | " | |
|   | 0.50 | " | " | " | " | |
|   | 1.00 | " | " | " | " | |
| 20 | 0.01 | Uneven | Good, uneven | Good | Good | Effect of particle size prominent |
|   | 0.05 | " | " | " | " | |
|   | 0.10 | Even | " | " | " | |
|   | 0.30 | " | Good | " | " | |
|   | 0.50 | " | " | " | " | |
|   | 1.00 | " | " | " | " | |

TABLE 4-continued

Composition and characteristic properties of phosphorescent resin material based on nylon 6 or nylon 66

| Pigment (wt%) | Activator (wt%) | Dispersibility of pigment | Phosphorescent property | Abrasion resistance | Strength | Moldability by injection |
|---|---|---|---|---|---|---|
| 25 | 0.01 | Uneven | Good, uneven | Good | Deficient | |
| | 0.05 | " | " | " | " | |
| | 0.10 | Even | " | " | " | Effect of particle size prominent |
| | 0.30 | " | Good | " | " | |
| | 0.50 | " | " | " | " | |
| | 1.00 | " | " | " | " | |

What is claimed is:

1. A phosphorescent synthetic resin material comprising:
a synthetic resin;
from about 5 to about 20% by weight of an $SrAl_2O_4$ phosphorescent pigment; and
from about 0.05 to about 0.5% by weight of an activator, based upon the total weight of said phosphorescent synthetic resin material, said activator comprising a surfactant containing liquid paraffin at a concentration of not less than about 70% by weight, based upon the weight of said activator.

2. The phosphorescent synthetic resin material according to claim 1, wherein said phosphorescent pigment, $SrAl_2O_4$, has an average particle diameter in the range of 1 to 75 μm.

3. The phosphorescent synthetic resin material according to claim 1, wherein said phosphorescent pigment, $SrAl_2O_4$, has an average particle diameter in the range of 5 to 25 μm.

4. The phosphorescent synthetic resin material according to claim 1, which has the form of pellets manufactured by kneading said phosphorescent synthetic resin material at a temperature 10° to 20° C. higher than the melting point of said synthetic resin.

5. A formed article of phosphorescent synthetic resin obtained by forming the phosphorescent synthetic resin material set forth in claim 1 into a formed article.

6. The formed article according to claim 5, which is obtained by subjecting said phosphorescent synthetic resin material to molding selected from the group consisting of injection molding, extrusion molding, transfer molding, and compression molding.

7. A method of producing a phosphorescent resin material, comprising the steps of:
mixing a synthetic resink an $SrAl_2O_4$ phosphorescent pigment and from about 0.05 to about 0.5% by weight, based upon the weight of said phosphorescent resin material of an activator, said activator comprising liquid paraffin in a concentration of not less than 70% by weight, based upon the weight of said activator, and
kneading the resultant mixture at a temperature 10° to 20° C. higher than the melting point of said synthetic resin.

8. The method according to claim 7, further comprising extruding the kneaded mixture at a temperature 10° to 20° C. higher than the melting point of said synthetic resin under an extrusion pressure in the range of 50 to 130 kg/cm² to form extruded strands and thereafter, chopping the extruded strands to produce pellets.

9. The method according to claim 7, wherein said phosphorescent pigment, $SrAl_2O_4$, has an average particle diameter in the range of 1 to 75 μm and is incorporated in said synthetic resin at a concentration in the range of 5 to 20% by weight.

* * * * *